Oct. 22, 1963  R. B. BOSSLER, JR  3,107,886
HYDRAULIC SYSTEM FOR AIRCRAFT LANDING GEAR
AND HYDRAULIC ACTUATOR THEREFOR
Filed Nov. 9, 1961  2 Sheets-Sheet 1
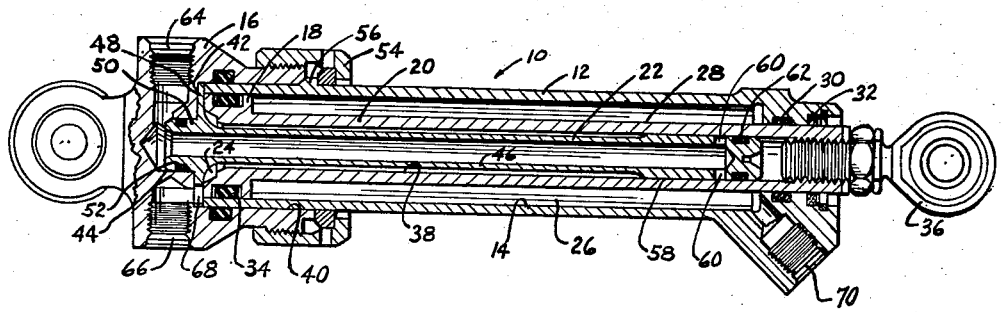
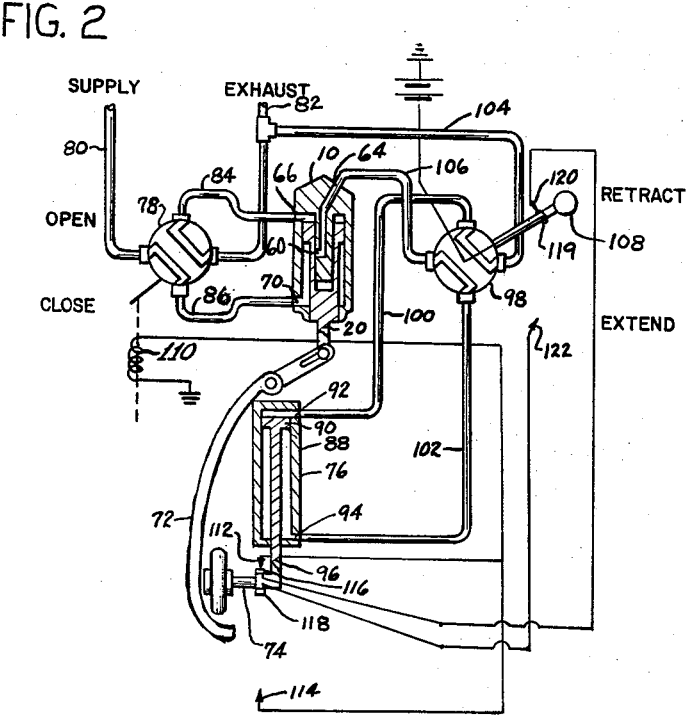
INVENTOR.
ROBERT B. BOSSLER, Jr.
BY
ATTORNEYS Oct. 22, 1963  R. B. BOSSLER, JR  3,107,886
HYDRAULIC SYSTEM FOR AIRCRAFT LANDING GEAR
AND HYDRAULIC ACTUATOR THEREFOR
Filed Nov. 9, 1961

United States Patent Office 3,107,886
Patented Oct. 22, 1963

3,107,886
HYDRAULIC SYSTEM FOR AIRCRAFT LANDING GEAR AND HYDRAULIC ACTUATOR THEREFOR
Robert B. Bossler, Jr., Bloomfield, Conn., assignor to Kaman Aircraft Corporation, a corporation of Connecticut
Filed Nov. 9, 1961, Ser. No. 151,227
15 Claims. (Cl. 244—102)

This invention relates in general to hydraulic systems, and deals more particularly with such a system adapted for use, among other things, in effecting and controlling the movement of various parts of a retractable aircraft landing gear of the type in which the landing gear when retracted is located within a wheel well closed by a movable door or fairing. It also relates to a hydraulic actuator particularly useful in such a system and including valve means for obtaining sequential operation of the wheel well door and landing gear.

The general object of this invention is to provide an arrangement for controlling the actuation of two hydraulic motors or actuators in such a manner that the actuation of the second motor follows the actuation of the first and wherein the actuation of the second motor cannot take place until the actuation of the first is complete.

Another object of this invention is to provide a hydraulic actuator or motor having an output member movable between actuated and unactuated positions and which actuator includes a valve for controlling the application of pressurized working fluid to a secondary line for use in operating another actuator or the like, the valve being operated in response to the movement of the output member so as to be open to supply working fluid to said secondary line when said output member is in its actuated position and to be closed to shut off the supply of working fluid to said secondary line when said output member is out of its actuated position.

A more specific object of this invention is to provide a hydraulic system for actuating the parts of a retractable aircraft landing gear mechanism and which system includes sequencing means for programming the movement of various parts of the system so that the movements are effected in a definite predetermined pattern.

A still further object of this invention is to provide a means for effecting and controlling the movement of the landing gear and wheel well door of a retractable aircraft landing gear mechanism whereby the landing gear is positively prevented from being moved from its retracted to its extended position until the wheel well door is fully opened and whereby the wheel well door as the landing gear is retracted is positively prevented from closing until the retracting process is fully completed.

Another object of the invention is the provision of a retractable aircraft landing gear system which eliminates the use of mechanically tripped electrical switches and which instead uses a highly reliable hydraulic sequencing means for programming the movement of the various parts of the system.

Further objects and advantages of the invention will be apparent from the drawings and from the following description.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:
FIG. 1 is a longitudinal sectional view taken through a hydraulic actuator embodying one aspect of the present invention.
FIG. 2 is a schematic view illustrating a hydraulic system embodying another aspect of the present invention, which system is applied to a retractable aircraft landing gear mechanism and employs the hydraulic actuator of FIG. 1, the view showing the landing gear in its retracted position with the wheel well door closed.
FIG. 3 is a view similar to FIG. 2 but with the landing gear being shown in its extended position and the wheel well door being shown in its open position.
FIG. 4 is another view similar to FIG. 2, but with the landing gear being shown in its extended position and the wheel well door being shown in its closed position.

*Detailed Description of Actuator—FIG. 1*

Figure 4:
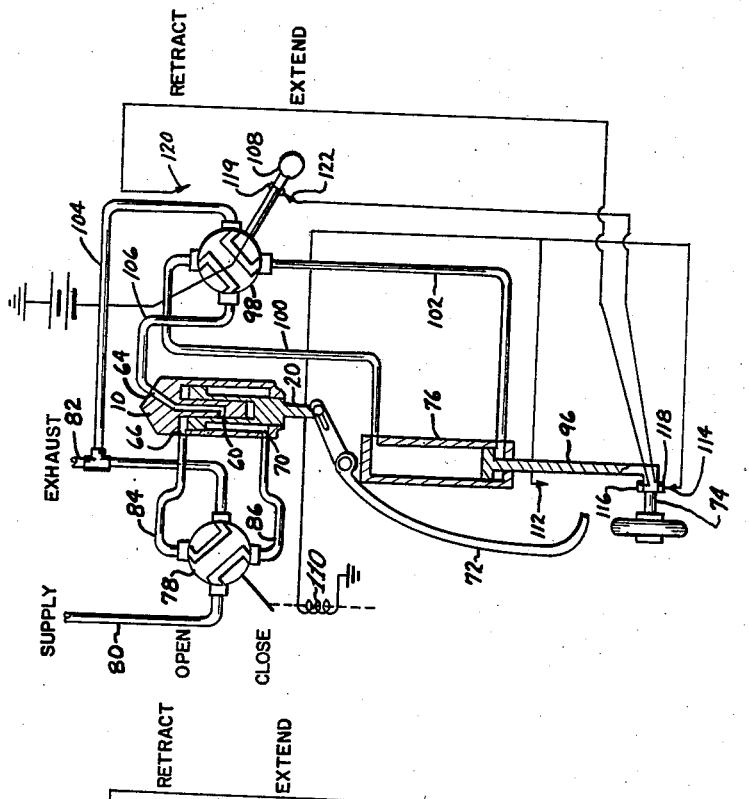

Insofar as the present invention relates to a hydraulic system wherein two actuators or the like are controlled in a definite sequential pattern, the invention is not in its broader aspects necessarily limited to the use of a hydraulic actuator such as shown in FIG. 1. The use of such an actuator is, however, preferred because of various novel advantages residing therein and accordingly the system shown in FIGS. 2, 3 and 4 has been shown to include such an actuator. Before discussing the arrangement of this system attention is directed to FIG. 1 for a description of the actuator.

Referring to FIG. 1, the actuator therein illustrated is indicated in general by the reference numeral 10 and includes a housing comprised of an axially elongated part 12, having a cylindrical bore 14, and a base member 16. Also included in the actuator is an output member in the form of a piston 18 and piston rod 20 and a tube member 22. The piston 18 is slidable within the housing bore 14 for a given axial stroke between first and second limits and divides the bore 14 into first and second working or expansible chambers 24 and 26 respectively. In FIG. 1 the piston 18 and piston rod 20 are shown moved to the inner or left-hand limit of the piston stroke at which limit the chamber 24 has a minimum volume and the chamber 26 a maximum volume.

The piston rod 20 in the illustrated case is integrally connected with the piston 18 and extends from the right-hand face of the piston toward and through the rod or right-hand end portion of the housing part 12. The piston rod 20 has a cylindrical outer surface 28 of uniform diameter along its length and at its rod end the housing part 12 is designed to sealingly engage this surface, the housing preferably being fitted with seals 30 and 32 for this purpose. The piston 18 also carries a ring seal 34 for sealingly engaging the housing bore 14. At its outboard end the piston rod 20 is provided with a suitable fitting 36 for attachment with mechanism operated by the actuator.

The tubular member 22 is positioned centrally of the housing part 12 within the bore 14. For receiving his member the piston 18 is centrally apertured and the piston rod 20 provided with a longitudinally extending bore. In the illustrated case the aperture in the piston 18 and the bore in the piston rod 20 form one continuous bore 38 of uniform cylindrical cross-section which bore extends from the left-hand end face of the piston 18 and for substantially the entire length of the piston rod 20, the bore 38 being closed at the outboard end of the piston rod by the fitting 36 which is threaded into the bore 38 as shown.

For supporting the tubular member 22 the base member 16 is designed with a forwardly facing cylindrical opening or bore 40 which bore terminates in a generally radial rear surface or shoulder 42. Rearwardly or to the left of the shoulder 42 the base member 16 further includes a smaller diametered centrally located bore 44. The tubuar member 22 in turn includes an elongated stem portion 46 which passes through the chamber 24 and into the bore 38 of the piston rod, a radial flange 48 which engages the bottom surface 42 of the base member 16, and a short cylindrical piloting portion 50 which is entered into the bore 44. Carried by the piloting portion 50 is an annular seal 52 which sealingly engages the bore 44. The base end portion of the housing part 12 has a cylindrical outer surface and is entered into the opening 40 of the base member 16 as shown and with the result that the end surface of the housing part 12 engages the marginal portion of the flange 48 so that the flange is interposed between the radial shoulder 42 and the part 12 and held in place thereby. The housing part 12 is in turn held in connected relation with the base member 16 by a union nut 54 which is threaded onto the outer surface of the base member 16 and which cooperates with a radial flange 56 on the outer surface of the housing part 12.

The stem portion 46 of the tubular member 22 at its free or right-hand end has a cylindrical outer surface 58 which exactly conforms to and sealingly engages the cylindrical bore 38 of the piston and piston rod. The cylindrical surface 58 may extend the entire length of the stem portion 46, but preferably and as shown, it extends for only a short axial distance with the remainder of the stem having a reduced diameter outer surface. Within the axial extent of the surface 58 the stem is provided at one axial location with two openings 60, 60 which extend radially through the wall of the tubular member and which openings are normally closed by the bore 38 of the piston rod due to engagement of the bore surface with the stem surface 58. The number of these openings is, however, not critical and any other number may be used if desired. To the right of these openings the bore of the tubular member 22 is closed and the outer surface of the member provided with an annular sealing ring 62 which engages the piston rod bore. In the present instance the openings 60, 60 are so located as to be closed by the piston rod bore throughout the major portion of the stroke of the piston and piston rod but to be opened and in communication with the expansible chamber 24 when the piston and piston rod move to the right-hand limit of their travel. That is, the relative dimensions of the various parts are such that as the piston 18 approaches engagement with the right-hand end of the housing part 12 the surface of the bore 38 is moved beyond the openings 60, 60 to open the same and provide communication between the chamber 24 and the bore of the tubular member 22. Similarly, when the piston is displaced to the left a short distance from its right-hand limit the openings 60, 60 will be closed by the surface of the bore 38 to isolate the bore of the tubular member from the chamber 24.

At its base end the bore of the tubular member 22 is open and communicates with a port 64 formed in the base member 16. The base member 16 also includes another port 66 which communicates with the chamber 24 through an opening 68 in the flange 48. At its rod end the housing part 12 is provided with a port 70 which communicates with the chamber 26.

From the foregoing it will be noted that the chamber 24 is essentially defined by the outer surface of the stem 46, the bore 14 of the housing member 12 and the piston 18, and that the chamber 26 is essentially defined by the outer surface of the piston rod 28, the bore 14 of the housing 12 and the piston 18. Supplying pressurized working fluid to the chamber 24 through the port 66 while at the same time exhausting fluid from the chamber 26 through the port 70 will cause the piston and piston rod to be moved to the right toward the right-hand or outer limit of the piston stroke to extend the piston rod. Reversing the supply and exhaust between the chambers 24 and 26 causes the piston and piston rod to be moved to the left toward the left-hand or inner limit of the piston stroke to retract the piston rod. It will further be understood that as the piston and piston rod are moved toward the right by the supplying of pressurized fluid to the chamber 24, the openings 60, 60 will be eventually opened as the piston approaches its right-hand limit. When this occurs the pressurized fluid supplied to the chamber 24 is enabled to pass into the bore of the tubular member 22 and to the port 64 and from there to any other hydraulic device connected to the port 64. The tubular member 22 thus provides part of a flow path between the ports 66 and 64, and the openings 60, 60 in cooperation with the piston rod bore 38 provide a valve in such flow path for controlling the flow therethrough in response to the piston position, the flow path being closed when the piston is in one position and open when the piston is in another position. In the illustrated case, and as mentioned previously, the position of the openings 60, 60 and the design of the bore 38 is such that the flow path between the ports 66 and 64 is closed for the major extent of the piston stroke and open only when the piston is at or near the right-hand or outer limit of its stroke. It is to be understood, however, that the invention is not, at least in its broader aspects, limited to this particular valve operation and that by simply relocating the openings 60, 60 or changing the design of the bore 38 the opening of the flow path could be made to occur at any piston position.

Figure 3:
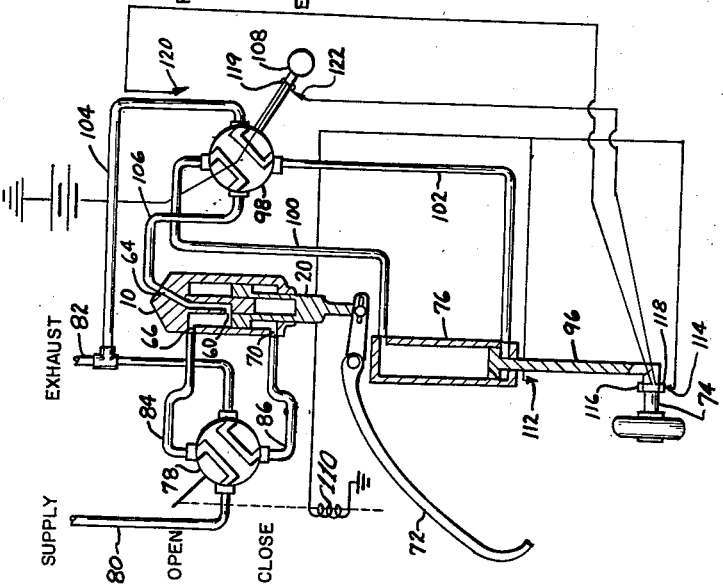

*Description of Hydraulic System—FIGS. 2, 3 and 4*

A hydraulic system using the actuator 10 of FIG. 1 to effect sequential operation of itself and of a second hydraulic actuator is shown in FIGS. 2, 3 and 4, the illustrated system being shown as applied to the actuation and control of the various parts of a retractable aircraft landing gear mechanism. In these figures the element 72 schematically represents a movable fairing or wheel well door operably connected to the actuator 10, the actuator 10 serving to move the door between open and closed positions relative to a wheel well defined by the structure of the aircraft. In FIGS. 2 and 4 the door is shown in its closed position and in FIG. 3 the door is shown in its open position. The part indicated at 74 schematically represents the movable linkage and other parts associated with one wheel of the landing gear mechanism, this linkage being in turn operatively connected to a second hydraulic actuator 76 for movement thereby between a retracted position, shown in FIG. 1, and an extended position, shown in FIGS. 3 and 4. The landing gear mechanism 74, when retracted, and the actuator 76 are located within the wheel well. In an actual system there will usually be two doors similar to the door 72, and two landing gear mechanisms similar to the mechanism 74, located one on either side of the fuselage and although only one door and one mechanism is shown for convenience in the present case it is to be understood that by proper linkage the actuator 10 may be used to simultaneously operate both doors and the actuator 76 is used to actuate both landing gear mechanisms. Also, there could be two actuators similar to the actuator 76 for actuating the two landing gear mechanisms with the two actuators being interconnected by suitable piping.

Referring to FIGS. 2, 3 and 4, the system therein illustrated includes, in addition to the above described apparatus, a control valve 78, sometimes referred to hereinafter as a secondary valve, which operates to control the supplying and exhausting of pressurized hydraulic working fluid to the ports 66 and 70 of the actuator 10. The control valve 78 includes two ports which are connected respectively to a supply line 80 and an exhaust line 82. The supply line 80 in turn is connectible with a suitable source of pressurized hydraulic fluid and the line 82 is connectible with a suitable exhaust reservoir or sump. Two other ports of the valve 78 are connected respectively by the lines 84 and 86 to the ports 66 and 70 of the actuator 10. The valve 78 includes a valve element which is movable between a first or door opening position and a second or door closing position. In the door opening position, shown in FIG. 3, the valve functions to connect the supply line 80 to the port 66 and the exhaust line 82 to the port 70 with the result that working fluid is supplied to the actuator chamber 24 to extend the piston and piston rod of the actuator and to thereby open the door 72. In its door closing position, shown in FIG. 2, the valve 78 functions to reverse the connections so that working fluid is supplied to the actuator chamber 26 to retract the piston and piston rod thereby closing the door 72.

As shown, the actuator 76 is of a conventional double acting type and includes a housing 88 having a bore, a piston 90 movable in the bore for a given axial stroke and dividing the bore into two expansible chambers, and two ports 92 and 94 communicating respectively with said two chambers. Connected with the piston 90 is a piston rod 96 connected with the landing gear mechanism 74. In one limit of its stroke the piston 90 and the associated piston rod 96 hold the landing gear in its retracted position as shown in FIG. 2 while in the other limit of the piston stroke the piston and piston rod hold the landing gear in its extended position as shown in FIGS. 3 and 4.

Associated with the actuator 76 is another control valve 98, sometimes referred to hereinafter as a master valve, having two ports connected with the ports 92 and 94 by the lines 100 and 102 respectively. One other port of the valve 98 is connected by a line 104 to the exhaust line 82, and another line 106 is connected between a fourth port of the valve 98 and the port 64 of the actuator 10, said fourth port being the high pressure or inlet port of the valve 98. The valve 98 includes a valve member which is movable by a handle 108, or other suitable pilot operable device, between landing gear retract and landing gear extend positions. In the landing gear retract position, shown in FIG 2, the valve 98 functions to provide communication between the line 106 and the line 102 and to also provide communication between the exhaust line 104 and the line 100. Accordingly, if the valve is in this position and pressurized working fluid is supplied to the line 106 the actuator 76 will be operated to move the landing gear mechanism 74 towards its retracted position. In its landing gear extend position, shown in FIGS. 3 and 4, the valve 98 functions to connect the line 100 to the line 106 and the line 102 to the exhaust line 104 and, accordingly, if pressurized working fluid is supplied to the line 106 with the valve in this position the actuator 76 will be operated to extend the landing gear mechanism.

Whether or not the line 106 is supplied with pressurized working fluid depends on the condition of the actuator 10 and accordingly on the position of the door 72. Because of the valve provided between the port 64 and the port 66 of the actuator 10 the line 106 will be in communication with the line 84 only when the piston of the actuator 10 is moved to the full outer limit of its stroke corresponding to a fully opened condition of the door 72. Therefore, only when the door 72 is fully open is it possible to extend or retract the landing gear.

Assuming that the landing gear is retracted and the wheel well door is closed it will be observed that in order to extend the landing gear the valve 78 must first be moved to its door open position and the valve 98 moved to its landing gear extend position. Either valve may be moved first, but in any event the landing gear mechanism will not be extended by the actuator 76 until the door 72 is fully opened by the actuator 10. After the landing gear is fully extended the valve 98 may be left in the landing gear extend position and the valve 78 returned to its former position to cause the actuator 10 to return the door 72 to its closed position, it being desirable in many cases to reclose the wheel well door after extension of the landing gear in order to reduce wind resistance and/or to prevent the door from striking the ground on landing. Assuming that the wheel well door 72 is closed with the landing gear extended, the control valve 78 and the control valve 98 may thereafter be moved in any sequence to their door open and landing gear retract positions to retract the landing gear, but regardless of the order in which these valves are moved the landing gear will not retract until the door 72 is moved to its fully open condition by the actuator 10.

The secondary valve 78 may, similar to the master valve 98, be made directly operable by the pilot, but preferably and as illustrated the system includes means for slaving the secondary valve to the master valve and the landing gear mechanism so that it is moved to its door opening position whenever the position of the landing gear mechanism does not fully conform to the position thereof dictated by the position of the master valve. That is, this means is such that if the master valve 98 is moved to its landing gear retract position and the landing gear is not fully retracted, or if the master valve is moved to its landing gear extend position and the landing gear is not fully extended, the secondary valve will be positioned to open the door 72. Likewise, when the master valve is in the landing gear retract position and the landing gear is fully retracted, or when the master valve is in its landing gear extend position and the landing gear is fully extended, the secondary valve is operated to close the door 72.

A suitable means for effecting such operation of the secondary valve is shown in FIGS. 2, 3 and 4 to include an electric solenoid 110 associated with the secondary valve, the valve being so constructed that in its normal state corresponding to de-energization of the solenoid 110 the valve is in its door opening position, as shown in FIG. 3, while when the solenoid is energized the valve is moved to its door closing position. That is, the valve 78 may be spring biased or otherwise urged toward the "open" position shown in FIG. 3 and moved to the "close" or FIG. 1 position by the energization of its solenoid. One side of the solenoid is connected to ground, as shown, and the other side is connected in parallel to two contacts 112 and 114 which contacts are fixed relative to the aircraft structure and cooperate respectively with two other contacts 116 and 118 carried by a movable part of the landing gear mechanism 74. The arrangement of these contacts is such that when the landing gear mechanism is fully retracted the contact 112 engages the contact 116 and when the landing gear mechanism is fully extended the contact 118 engages the contact 114. Associated with the master valve 98 is a double throw switch which for convenience has been illustrated to constitute a contact element 119 carried by the handle 108 and two stationary contacts 120 and 122 connected respectively with the contacts 116 and 118. The contact element 119 on the handle 108 is connected to a source of negative potential as shown. When the handle is in its landing gear retract position, as shown in FIG. 2, the contact element 119 engages the contact 120 to apply a negative potential to the contact 116, and when the handle 108 is moved to its landing gear extend position, as shown in FIGS. 3 and 4, the contact element 119 engages the fixed contact 122 to apply a negative potential to the contact 118. Thus, when the handle 108 is in the retract position and the landing gear is fully retracted a closed circuit is formed through the contacts 120 and 119 and through the closed contacts 116 and 112 to energize the solenoid 110 and to thereby cause the secondary valve 78 to be moved to its door closing position. Likewise, if the handle 108 is moved to its extend position and the landing gear is fully extended a closed circuit is provided through the contacts 119 and 122 and through the contacts 114 and 118 to energize the solenoid 110 and to again move the secondary valve 78 to its door closing position.

*Operation of Hydraulic System—FIGS. 2, 3 and 4*

The operation of the hydraulic system including the electrical means for controlling the operation of the secondary valve 78 may be best understood by referring in sequence to FIGS. 2, 3 and 4.

In FIG. 2, the landing gear is shown fully retracted and the wheel well door 72 shown moved to its closed position. Under these circumstances a closed electrical circuit is provided to the solenoid 110 so that the latter is energized and the control valve 78 held thereby in its door closing position. No movement of the door 72 or of the landing gear mechanism will therefore take place until the master control valve 98 is moved from the position shown. It should be noted, however, that the door 72 is held closed as a result of the energization of the solenoid 110 and that in the event of an electrical failure the solenoid 110 will be de-energized to open the door 72, the control valve 78 being moved to its deenergized or "open" position by the action of an associated bias spring or the like. The system is therefore fail-safe insofar as a failure of the electrical supply and will not prevent extension or retraction of the landing gear due to a closed wheel well door. It should be noted that due to the closed position of the valve between the lines 106 and 84, the fluid in the bottom chamber of the actuator 76 is prevented from escaping so that the piston thereof is hydraulically locked in the landing gear retract position.

If the handle 108 of the master control valve is now moved to its landing gear extend position the contact 119 is removed from the contact 120, thereby opening the circuit to the solenoid 110. At the same time the contact 119 will be brought into engagement with the contact 122, but this will have no effect on the energization of the solenoid 110 due to the open condition of the contacts 114 and 118. The control valve 78 is therefore moved to its normal or door opening position, which position is shown in FIG. 3, as a result of the solenoid being de-energized. In this position pressurized working fluid from the supply line 80 passes to the line 84 and fills the chamber 24 of the actuator 10 to move its piston toward its outer limit to extend the piston rod 20 and open the door 72. As the piston reaches the position corresponding to a fully opened condition of the door 72 the openings 60, 60 in the stem 22 are opened to provide communication between the line 84 and the line 106. The pressure fluid from the line 80 therefore flows through the line 84 and the line 106 and through the valve 98 to the line 100 to extend the piston and piston rod of the second actuator 76 and thereby moves the landing gear mechanism to its extended position. As the landing gear mechanism reaches its extended position, the contact 118 is brought into engagement with the contact 114 and this in conjunction with the closed condition of the contacts 119 and 122 again energizes the solenoid 110.

Energization of the solenoid in turn moves the secondary valve 78 to its door closing position, as shown in FIG. 4, so that pressurized working fluid from the line 80 passes through the line 86 to move the piston and piston rod of the actuator 10 to their retracted position to close the dor 72. This ends the extending cycle of operation and no further movement of the door or landing gear mechanism will take place until the master valve handle is again moved to its landing gear retract position. It should be observed, however, that with the landing gear mechanism in its fully extended position and with the wheel well door closed, as shown in FIG. 4, the closed condition of the valve between the lines 84 and 106 serves to prevent the escape of fluid from the upper chamber of the actuator 76 so that the landing gear mechanism is hydraulically locked in its extended position.

On movement of the master valve control handle to the landing gear retract position the operation should be evident from the drawings and from the above description and therefore no further discussion of this operation is deemed necessary. In this case, the movement of the various parts is such that the wheel well door 72 first moves to its fully open position, the landing gear mechanism is then retracted to its fully retracted position and thereafter the door is again closed.

In conclusion, it should be understood that while the valve provided by the actuator 10 between the lines 84 and 106 is particularly well adapted for use in the illustrated system, other types of valves operable in response to the position of the door 72 or of the piston of the door actuator may be used without departing from the broader aspects of the invention.

It should also be noted and understood that although the actuator shown in FIG. 1 shows only one set of openings 60, 60 in the tubular member 22 communicating with one passageway in the tubular member and received by the moving piston, there could instead be several openings or sets of openings in the tubular member each communicating with one of several passageways in the latter member and leading to separate mechanisms which would be sequentially actuated by the moving piston.

The invention claimed is:

1. A hydraulic actuator comprising a housing having a cylindrical bore, a piston movable in said bore for a given axial stroke and dividing said bore into first and second working chambers, a piston rod connected with said piston and extending through one end of said housing, means in said housing defining first and second ports communicating respectively with said first and second working chambers for supplying and exhausting working fluid to and from said chambers, means in said housing defining a third port adapted for connection with an auxiliary fluid actuated device, means defining a flow path providing communication between only said first and third ports, and valve means in said flow path for controlling the flow of working fluid between said first and third ports in accordance with the position of said piston relative to said housing bore and in such a manner that said flow path is closed when said piston is at one limit of its stroke and open when at the other limit of its stroke whereby said third port is placed in open communication with said first port when said piston is at said other limit of its stroke and is blocked from communication with both said first and second ports when said piston is at said one limit of its stroke.

2. A hydraulic actuator comprising a housing having a cylindrical bore, a piston movable in said bore for a given axial stroke between inner and outer limits and dividing said bore into first and second working chambers, a piston rod extending through one end of said housing and connected to said piston for movement therewith so as to be extended when said piston is at the outer limit of its stroke and retracted when said piston is at the inner limit of its stroke, means in said housing defining first and second ports communicating respectively with said first and second working chambers for supplying and exhausting working fluid to and from said chambers, means in said housing defining a third port adapted for connection with an auxiliary fluid actuated device, means defining a flow path providing communication between only said first and third ports, and valve means in said flow path for controlling the flow of working fluid between said first and third ports in accordance with the position of said piston relative to said housing bore and in such a manner that said flow path is closed for the major portion of the stroke of said piston and open only when said piston is located at or near the outer limit of its stroke whereby said third port is placed in open communication with said first port only when said piston is at or near the outer limit of its stroke and is blocked from communication with both said first and second ports when said piston is at all other positions in said cylinder.

3. A hydraulic actuator comprising a housing having a cylindrical bore and rod and base end portions, an apertured piston movable in said bore for a given axial stroke and dividing said bore into a first working chamber adjacent said base end of said housing and a second working chamber adjacent said rod end of said housing, a hollow piston rod connected with said piston and extending through said rod end portion of said housing, said piston rod being open at its inboard end and arranged so that its bore communicates with the aperture in said piston and being closed at its outboard end, a tube fixed relative to the base end portion of said housing and extending axially toward said rod end portion through said piston aperture and the bore of said piston rod and which tube is closed at its outboard end and provided thereat with at least one radial opening which opening is normally closed by the bore of said piston rod but opened to provide communication between said first working chamber and the bore of said tube as said piston and piston rod move to the outward limit of their stroke, means in said housing defining first and second ports communicating respectively with said first and second chambers for supplying and exhausting working fluid to and from said chambers, and means in said housing defining an outlet port communicating with the bore of said tube and adapted for connection with an auxiliary fluid actuated device whereby working fluid supplied to said first chamber through said first port is conducted to said outlet port to operate said auxiliary device only after said piston is displaced by said working fluid a given distance from the inner limit of its stroke.

4. Hydraulic actuator comprising a housing having a cylindrical bore and rod and base end portions, a piston movable in said bore for a given axial stroke and dividing said bore into a first working chamber adjacent said base end of said housing and a second working chamber adjacent said rod end of said housing, a piston rod connected with said piston and extending through said rod end portion of said housing, said piston and piston rod having a bore which bore extends through said piston and for some distance axially of said rod, a tube fixed relative to the base end portion of said housing and extending axially toward said rod end portion through said latter bore and which tube is closed at its outboard end and provided with at least one radial opening passing through its wall, said tube having an outer surface surrounding said opening and said latter bore including a conforming surface which engages said outer tube surface to close said opening when said piston and piston rod are at the inner limit of their stroke and which conforming surface moves beyond said opening to open the same as said piston and piston rod are moved toward the outward limit of their stroke to provide communication between said first working chamber and the bore of said tube, means in said housing defining first and second ports communicating respectively with said first and second chambers for supplying and exhausting working fluid to and from said chambers, and means in said housing defining an outlet port communicating with the bore of said tube and adapted for connection with an auxiliary fluid actuated device whereby working fluid supplied to said first chamber through said first port is conducted to said outlet port to operate said auxiliary device only after said piston is moved by said working fluid to the outer limit of its stroke.

5. A hydraulic actuator comprising a housing having a cylindrical bore, a piston slidably received by said housing bore for movement axially therealong between first and second axial positions and having connected thereto a piston rod which piston rod extends axially from one face of said piston and through one end of said housing, said housing including means at said one end for sealingly engaging the outer surface of said rod so that said rod, piston and housing bore define a second working chamber, said piston and said piston rod having a cylindrical bore formed therein which bore extends through said piston and for some distance axially of said piston rod, a hollow tube fixed relative to said housing and positioned in said latter bore and having a portion which sealingly engages the surface of said latter bore so that said tube, piston and housing bore define a first working chamber, said tube portion including an opening passing through the wall thereof and which opening is disposed so that when said piston is in its first position said piston rod bore closes said opening and so that as said piston reaches its second position said opening is opened to provide communication between said first working chamber and the bore of said tube, first and second port means communicating respectively with said first and second working chambers for supplying and exhausting working fluid to and from said chambers, and third port means communicating with said tube for supplying and exhausting working fluid to and from another device through said first working chamber when said piston is in its second position.

6. A hydraulic actuator comprising a base member having a forwardly facing opening therein and a generally radial bottom surface at the rear of said opening, a tubular member having one end positioned in said opening and including a radial flange which engages said bottom surface, said tubular member further including a stem which projects forwardly beyond said base member and which is closed at its forward end except for at least one radial opening passing through the wall thereof, a housing member having a rear end portion received by said base member opening and having a cylindrical bore surrounding said stem in radially spaced relationship, said rear end portion of said housing member being in engagement with the marginal portion of said flange of said tubular member so that said flange is interposed between said bottom surface and said housing portion and held in place thereby, a hollow working member including a piston and piston rod surrounding said stem and located in the space between said stem and said housing and which piston rod extends forwardly and through the forward end portion of said housing member, said cylindrical bore of said housing member and the outer surface of said stem defining a first working chamber rearwardly of said piston and said cylindrical bore of said housing member and the outer surface of said piston rod defining a second working chamber forwardly of said piston, means defining a first port in said base member which port passes through said flange of said tubular member and communicates with said first chamber, means in said housing member defining a second port communicating with said second chamber, means in said base member defining a port communicating with the bore of said tubular member, and valve means for preventing the flow of working fluid from said first chamber to said opening in said forward end portion of said stem when said working member is in the rearward limit of its stroke and for permitting such flow when said working member is moved to a position spaced forwardly from said rearward limit.

7. A hydraulic actuator as defined in claim 6 further characterized by said valve means comprising a first surface on said stem surrounding said opening and a second surface on the bore of said working member which second surface conforms to and engages said first surface to close said opening when said working member is in the rearward limit of its stroke and which is moved beyond said opening to open the same when said working member is moved to a position spaced forwardly from said rearward limit.

8. In a hydraulic system the combination comprising a first hydraulic actuator having an output member movable between first and second positions, a second hydraulic actuator, a supply line connectible with a source of pressurized working fluid, a first valve connected with said supply line and with said first actuator and movable between first and second positions for controlling the operation of said first actuator, a second valve having an inlet port and connected with said second actuator and movable between first and second positions for controlling the operation of said second actuator, and a third valve connected between said supply line and said inlet port of said second valve of controlling the application of pressurized working fluid from said supply line to said second actuator and operable in response to the position of said output member of said first actuator so as to be opened only when said output member is in its first position.

9. In a hydraulic system the combination comprising a first hydraulic actuator including a housing having a longitudinal bore, a piston movable in said bore for a given longitudinal stroke and defining with said bore an expansible working chamber for receiving pressure fluid to cause said piston to be moved against a load along the extent of its stroke, means defining an inlet port adapted for connection to a source of pressure fluid and communicating with said working chamber, means defining an outlet port, and means defining a flow path between said inlet port and said outlet port; a second hydraulic actuator having an inlet port for receiving pressure fluid to operate the same; a line connecting said outlet port of said first actuator to said inlet port of said second actuator; and valve means in said flow path of said first actuator and responsive to the position of said piston relative to the extent of its stroke for preventing flow between said inlet and outlet ports of said first actuator when said piston is in one position of its stroke and for permitting such flow when said piston is in another position of its stroke.

10. In a hydraulic system the combination comprising a first hydraulic actuator including a housing having a longitudinal bore, a piston movable in said bore for a given longitudinal stroke between first and second limits and defining with said bore an expansible working chamber for receiving pressure fluid the application of which to said chamber tends to move said piston toward the second limit of its stroke against a load applied thereto, means defining an inlet port adapted for connection to a source of pressure fluid and communicating with said working chamber, means defining an outlet port, and means defining a flow path between said inlet port and said outlet port; a second hydraulic actuator having an inlet port for receiving pressure fluid to operate the same; a line connecting said outlet port of said first actuator to said inlet port of said second actuator; and valve means in said flow path of said first actuator and responsive to the position of said piston relative to the extent of its stroke for preventing flow between said inlet and outlet ports of said first actuator when said piston is positioned anywhere within a major portion of its stroke and for permitting such flow only when said piston is located at or near said second limit of its stroke.

11. In a hydraulic system the combination comprising a first actuator including a housing having a cylindrical bore and rod and base end portions, a piston movable in said bore for a given axial stroke and dividing said bore into first and second working chambers, a piston rod connected with said piston and extending through said rod end portion of said housing, and means in said housing defining first and second ports communicating respectively with said first and second chambers for supplying and exhausting working fluid to and from said chambers; a second hydraulic actuator having an inlet port for receiving working fluid to operate the same; and means for supplying working fluid to said second actuator when said piston of said first actuator passes a predetermined point in moving toward one limit of its stroke, said latter means comprising means defining an axial bore in said piston and piston rod which bore passes through said piston and extends some distance into said piston rod, a tube having one end fixed to said base end portion of said housing and which tube extends through said first working chamber into said bore of said piston and piston rod and has at least one radial opening passing through the wall thereof which opening is normally closed by the bore of said piston and piston rod but opened as said piston passes said predetermined point in moving toward said one limit so that communication is established between said first chamber and the bore of said tube, and means connecting the bore of said tube to said inlet port of said second actuator.

12. In an aircraft having structure defining a well, a door movable between open and closed positions relative to said well, and mechanism located at least in part within said well and movable relative thereto between active and inactive positions, the combination comprising a hydraulic actuator having an output member operably connected with said door and movable between a first position at which said door is closed and a second position at which said door is open, said actuator including first and second ports communicating respectively with first and second working chambers arranged so that said output member is moved to its first position to close said door when working fluid is supplied to said first port and so that said output member is moved to its second position to open said door when working fluid is supplied to said second port, said actuator further including a third port and means including a valve for permitting working fluid to flow between said second and third ports when said output member is in said second position and for preventing flow between said second and third ports when said output member is out of said second position, a second hydraulic actuator operably connected with said mechanism and having an output member movable between a first position at which said mechanism is held in its inactive position and a second position at which said mechanism is held in its active position, said second actuator including a port communicating with a working chamber arranged so that said latter output member is moved to its second position when working fluid is supplied to said port, and means connecting said third port of said first actuator to said port of said second actuator with the result that working fluid is supplied to said second actuator to move said first mentioned mechanism to its active position only after said door is moved to its open position by said first actuator.

13. In an aircraft having structure defining a well, a door movable between open and closed positions relative to said well, mechanism located at least in part within said well and movable between active and inactive positions relative to said well, the combination comprising a first hydraulic actuator for opening and closing said door which actuator includes a housing having a cylindrical bore, a piston movable in said bore for a given axial stroke between door open and door closed positions and dividing said bore into first and second working chambers, means in said housing defining first and second ports communicating respectively with said first and second working chambers for supplying and exhausting working fluid to and from said chambers, the supplying of working fluid to said first chamber causing said piston to be moved toward its door open position, means in said housing defining a third port, means defining a flow path between said first and third ports, and valve means in said flow path for controlling the flow of working fluid between said first and third ports in accordance with the position of said piston and in such a manner that said flow path is closed for the major portion of the stroke of said piston and open only when said piston is located at or near its door open position; a second hydraulic actuator for moving said mechanism between its active and inactive positions and including a housing having a cylindrical bore, a piston movable in said bore for a given axial stroke between positions corresponding respectively to the active and inactive positions of said mechanism and dividing said bore into first and second working chambers, and means in said latter housing defining two ports communicating respectively with said latter first and second chambers for supplying and exhausting working fluid to and from said chambers; a supply line connectible with a source of pressurized working fluid; means including a master valve connected between said third port of said first actuator and said two ports of said second actuator and which master valve is movable between a first and second position at which said first and second ports of said second actuator are respectively connected with said third port of said first actuator; and means including a secondary valve connected between said supply line and said first and second ports of said first actuator and which valve is movable between the door opening position at which said supply line is connected with one of said latter ports and a door closing position at which said supply line is connected with the other of said latter ports.

14. The combination defined in claim 13 further characterized by means for controlling the position of said secondary valve in response to the concurrent positions of said master valve and of said mechanism whereby said secondary valve is positioned in its door opening position whenever the position of said mechanism does not fully conform to the position thereof dictated by the position of said master valve and whereby said secondary valve is positioned in said door closing position whenever the position of said mechanism does fully conform to the position thereof dictated by the position of said master valve.

15. The combintaion defined in claim 13 further characterized by said secondary valve being a solenoid operated valve normally positioned in said door opening position and movable to said door closing position in response to the energization of its solenoid, and electric circuitry connected with said solenoid and with said mechanism for energizing said solenoid only when said master valve is positioned in its first position with said mechanism in its active position or when said master valve is positioned in its second position with said mechanism in its inacitve position.

References Cited in the file of this patent

UNITED STATES PATENTS

| | | |
|---|---|---|
| 1,306,301 | Chadwick | June 10, 1919 |
| 1,641,001 | Kallbeck | Aug. 30, 1927 |
| 2,552,843 | Clifton et al. | May 15, 1951 |
| 2,707,940 | Harris | May 10, 1955 |

FOREIGN PATENTS

| | | |
|---|---|---|
| 248,660 | Great Britain | Mar. 11, 1926 |